Aug. 28, 1962 L. R. HARPER 3,051,853

RING COUNTER USING A WALKING CODE AND HAVING A COMMON PULSING LINE

Filed Jan. 28, 1959 2 Sheets-Sheet 1

BISTABLE DEVICES

| NUMBER OF PULSES | A | B | C | D | E |
|---|---|---|---|---|---|
| 0 | 1 | | | | 1 |
| 1 | | 1 | | | 1 |
| 2 | 1 | 1 | | | |
| 3 | 1 | | 1 | | |
| 4 | | 1 | 1 | | |
| 5 | | 1 | | 1 | |
| 6 | | | 1 | 1 | |
| 7 | | | 1 | | 1 |
| 8 | | | | 1 | 1 |
| 9 | 1 | | | 1 | |

Aug. 28, 1962 L. R. HARPER 3,051,853

RING COUNTER USING A WALKING CODE AND HAVING A COMMON PULSING LINE

Filed Jan. 28, 1959 2 Sheets-Sheet 2

3,051,853

RING COUNTER USING A WALKING CODE AND HAVING A COMMON PULSING LINE

Leonard Roy Harper, San Jose, Calif., assignor to International Business Machines Corporation, New York, N.Y., a corporation of New York Filed Jan. 28, 1959, Ser. No. 789,595
15 Claims. (Cl. 307—88.5)

Figures 1, 2:
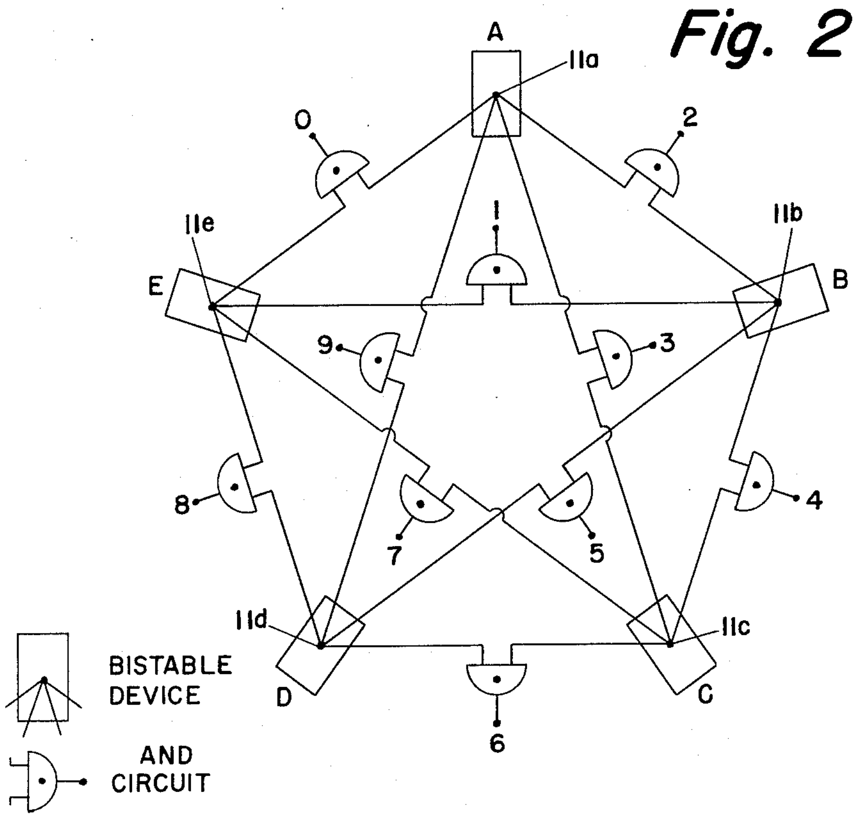

This invention relates to electronic commutators, more particularly to an improved ring circuit operated in accordance with a simple and effective code.

Electronic commutators usually include a plurality of bistable devices each having two stable states generally referred to as On and Off. These devices are cascaded to form a ring which may or may not be closed. Pulses applied to the ring cause predetermined switching of the bistable devices between On and Off states for production of outputs characteristic of the number of pulses which have been applied to the ring. For decade counters, ten devices have been provided which are in succession changed from one to the other of the two stable states, thus to provide decade counting of pulses. In some commutators less than ten bistable devices have been utilized. Thus the count may be accomplished by control circuits which change the states of the devices in accordance with a particular code, such for example, as disclosed in Compton et al. Patent No. 2,402,372.

Codes heretofore utilized have required complicated control circuits which, during a count of from 0–9 or 1–10, change the states of the bistable devices so that different numbers of them will, during a count, be in the same state to indicate in a distinctive manner the number of pulses received. Codes which have heretofore been utilized leave something to be desired in providing design flexibility for wider usefulness of such ring counters or electronic commutators.

Accordingly, it is an object of the present invention to provide a novel ring type of electronic commutator utilizing a two-by-two walking code.

Another object of the invention is to provide an electronic ring arrangement which may have incorporated therein any desired number of bistable devices and which jointly utilize the two-by-two walking code.

Still another object of the invention is to provide a decade counting system in which there are utilized five bistable devices functioning in accordance with the two-by-two walking code.

A still further object of the invention is to provide an electronic commutator comprising a series of commutation circuits which cooperate in a novel manner under the control of a series of input pulses.

In accordance with the present invention, a ring type of electronic commutator is provided comprised of a plurality of cascaded switching circuits. For convenience, these circuits will be referred to as triggers. Each switching circuit or trigger includes a bistable switching means, preferably with associated gate or control means connected in such a manner as to permit binary operation of the trigger; more particularly, each such bistable trigger or switching means includes transistors, at least one of which is normally on and at least one of which is normally off. These transistors function in conjunction with gating means so that under the influence of a succession of input pulses five such bistable triggers are in succession changed from one to the other states to form ten distinctive pairs from which ten output circuits extend. As the pulses are applied to the ring, there are produced changes of state of two of three adjacent bistable triggers with progression along the ring of the change of state of first one and then another of said devices as successive pulses are applied to the ring. Thus with ten distinctive pairs of the devices in succession in the same state, there is produced the combination of outputs needed for a decade counter. But five devices are required for a count of ten, six for a count of twelve, etc. Thus the numerical value of the count is equal to twice the number of devices in the ring where the action of each such counting circuit is characterized by its two-by-two walking code.

Figure 3:
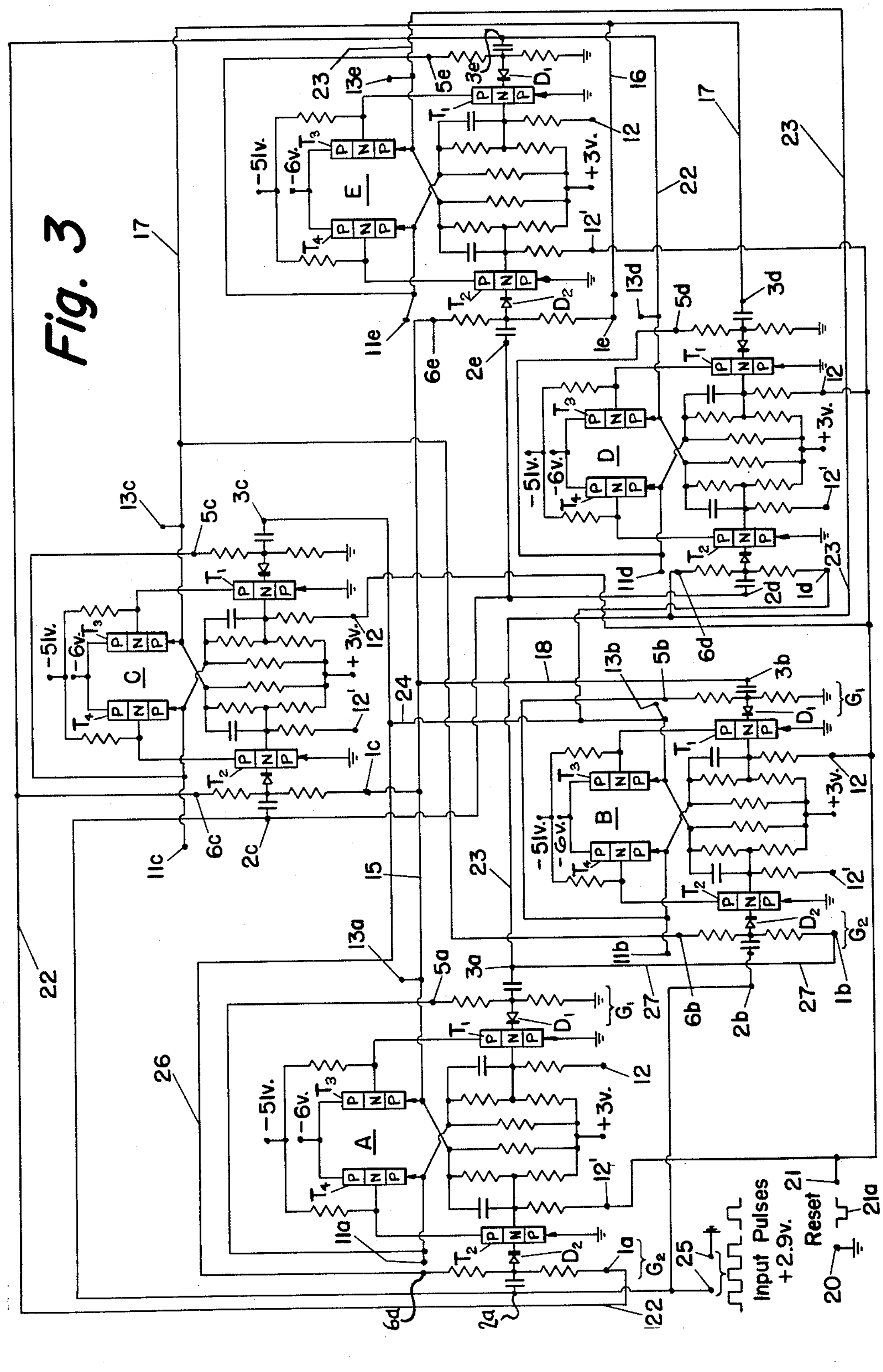

For further objects and advantages of the invention and for a detailed understanding of a preferred embodiment thereof, reference is to be had to the following description taken in conjunction with the accompanying drawings, in which:

FIG. 1 is a table illustrative of a five-place two-by-two walking code;

FIG. 2 schematically illustrates the output circuits of the system of FIG. 3 and in conformity with the code of FIG. 1; and FIG. 3 is a commutation circuit representing a preferred embodiment of the present invention.

Referring now to the drawings, and more particularly to FIG. 1, the present invention includes the concept of a five-place two-by-two walking code illustrated by the five columns A–E and the ten rows 0–9 in the decimal system. There are utilized five bistable triggers A–E, the operations of which have been illustrated by the "1's" appearing in the squares formed by the columns and rows. A "1" appearing in a square below a trigger represented by columns A–E is representative of a corresponding state of such a bistable switching device. For example, the "1's" appearing in the "0" row at columns A and E can be taken as indicative of the fact that each of the corresponding devices A and E has been switched to its On state. Thus, if the outputs from devices A and E are applied to a conventional AND circuit, there will be an output which may be taken as representative of zero in the decimal system. Such an output circuit has been illustrated in FIG. 2 as extending between bistable triggers A and E. It is connected to the AND circuit indicated by the symbol and from which the output is represented as "0." Upon application of the first pulse to be counted, trigger B is turned on and trigger A is turned off. Accordingly, the output circuit extending between triggers B and E to the AND circuit will produce therefrom an output indicative of one in the decimal system. For the second pulse, the trigger E will be turned off, while the trigger A will be turned on. Accordingly, from the output circuit extending between triggers A and B to the AND circuit, there will be produced an output representative of two in the decimal system.

With the triggers illustrated in the configuration of a ring, FIG. 2, the trigger E will be adjacent trigger A. Thus the above-described switching operations will have taken place between the three adjacent devices A, B and E, only two of them being in the same state at the same time. In a similar manner, to produce outputs representative of 3–9 in the decimal system, the triggers are controlled by succeeding pulses so that the trigger C is turned on at the time trigger B is being turned off. Thereafter, trigger B is turned on at the time trigger A is turned off. With the next input pulse, the group of three then advances by one as trigger D is turned on and trigger C turned off. More specifically, and referring to the application of the second pulse, FIG. 1, the two triggers or bistable devices A and B are on. The application of the third pulse turns on the bistable device C forward by one in the ring from device B, while the latter is turned off. On pulse 4 the device B preceding device C is turned on, while the device A, two devices backward in the ring from device C, is turned off. Thus it will be seen that there are always involved in making the count groups of three of the bistable devices in the ring, this group of three devices progressing along the ring as the count progresses, it being understood that only two of the devices are in the On state for any given count. The foregoing two-by-two progression of devices in the On state may be considered a two-by-two "walking" progression or walking code since first one and then the other of the two On devices "walks" one step in the ring for each applied input pulse. As the last step is made, the two devices in an On state have progressed one step. Then two more devices in an On state progress a step to provide the two-by-two walking code. More particularly, it may be considered that the first "two" represents the two On devices when they are adjacent each other in the ring configuration of FIG. 2 and that the second "two" represents the two On devices when they are separated by an Off device. Thus, the two On devices may initially be adjacent in the ring and then for the first input pulse, the two On devices will be separated by an Off device; for the second input pulse, the two devices will again be adjacent in the ring; and for the third input pulse, the two devices will again be separated by an Off device. In this manner, the two On devices are adjacent in the ring (representing the first "two") and then are separated by an Off device (representing the second "two") as the input pulses are applied to the ring to provide the walking code.

With subsequent input pulses, the two-by-two walking code continues until, with the ninth pulse, devices A and D will both be on. These two devices are relatively adjacent each other in the ring configuration of FIG. 2 since only separated by trigger E. For the tenth pulse, the initial conditions are established with devices A and E both on, since the output from the AND circuit between bistable triggers A and E may be utilized to initiate counting by a second decade counter. Thus, as many decade counters may be utlized in cascade connection as may be desired for a particular application.

Referring now to FIG. 3, there has been illustrated a preferred system for carrying out the invention, one utilizing five electronic triggers or switching devices A–E for a single stage of a multiple decade counter. Each switching device or trigger has two stable states; that is to say, each trigger when turned on will stay on and when turned off will stay off until it is desired, in accordance with the invention, to change the state of the device.

Though applicable to triggers of the vacuum tube type, the electronic switching devices or triggers of FIG. 3 have been shown as including four transistors $T_1$–$T_4$ together with a pair of gates $G_1$ and $G_2$. Each gate $G_2$ associated with each transistor $T_2$ has input terminals 1, 2 and 6, while each gate $G_1$ associated with each transistor $T_1$ has input terminals 3 and 5. To the terminals 1, 2, 3, 5 and 6 there have been added lower-case subscripts corresponding with triggers A–E. The gates $G_1$ and $G_2$, respectively, include voltage-dividing resistors and diodes $D_1$ and $D_2$ each connected between the junctions of the pair of voltage-dividing resistors and the base of transistors $T_1$ and $T_2$. The collectors of transistors $T_1$ and $T_2$ are respectively connected to the bases of transistors $T_3$ and $T_4$. The bases of transistors $T_1$ and $T_2$ are, through R-C networks, respectively cross-connected with the emitters of transistors $T_3$ and $T_4$.

For ease in explaining the invention, voltage values have been applied to the appropriate terminals of each trigger. It is to be understood that other sources of supply providing different voltages may be utilized depending upon the particular transistors utilized and the resistance values selected for the resistors in the electronic switching circuits forming the bistable switching devices.

With the above brief explanation of the principal features of the circuit forming each bistable trigger, it is believed the operation as a whole can be readily understood by now describing the operation of the system under the control of applied input pulses.

Assuming now that there has been previously applied at reset terminals 20 and 21 a negative-going reset pulse 21*a*, which, as will later be explained in detail, causes triggers A and E which are adjacent in the ring to be turned on. The transistors $T_2$ of each of said triggers A and E are then conductive; that is, on. Each of triggers B–D is turned off. The transistors $T_2$ of triggers B–D are non-conductive; the transistors $T_1$ of triggers B–D are conductive; while the transistors $T_3$ of triggers B–D are in a less conductive condition than the transistors $T_4$ of triggers B–D. When transistor $T_1$ is conductive or on, the bistable device of which it is a part is off.

It is to be observed that the terminal 1*a* of gate $G_2$ of trigger A is by conductor 22 connected to terminal 13*d* of trigger D (the trigger two triggers backward in the ring from trigger A), and that terminal 6*a* of gate $G_2$ is by way of conductors 26 and 24 connected to terminal 13*b* of trigger B (the trigger next forward in the ring from trigger A). Since transistors $T_3$ of the triggers B and D are in their less conductive condition, the terminals 13*b* and 13*d* are at, or closely approximating, zero or ground potential. Accordingly, the junction between the two resistors interconnecting terminals 1*a* and 6*a* is near or at ground potential. Accordingly, if there be applied a positive-going input pulse to the transistor $T_2$ of device A, as from supply terminals 25 to input terminal 2*a* and thence by way of a coupling capacitor and diode $D_2$ to the transistor $T_2$, that transistor will be turned off. The results of the application of such a pulse to turn transistor $T_2$ off will be described after considering the potential existing at the junctions of corresponding resistors in the remaining triggers or switching devices, prior to the application of the positive-going input pulse.

It will be observed that terminal 6*e* of trigger E is connected by way of conductor 15 to terminal 13*a* of trigger A which is next forward in the ring from trigger E. Since transistor $T_3$ of trigger A is in its more conductive condition, terminals 13*a* and 6*e* will have applied thereto a potential of $-5.8$ volts. Terminal 1*e* of trigger E is by conductors 16 and 17 connected to terminal 13*c* of trigger C which is two triggers backward in the ring from trigger E. Since transistor $T_3$ of trigger C is in its less conductive condition, the potential at terminals 13*c* and 1*e* will be zero; that is at, or closely approaching, ground potential. Accordingly, due to the negative potential applied to terminal 6*e*, there will be developed at the junction between the resistors interconnecting terminals 1*e* and 6*e* a negative potential of $-2.9$ volts. By reason of the connections to the sources of supply, as indicated, the base of transistor $T_2$ of trigger E is at a potential of $-0.3$ volt. The result is that the diode $D_2$ of trigger E is biased to cut-off, since the anode thereof is connected to the negative potential of $-2.9$ volts and the cathode to a negative potential of $-0.3$ volt. Accordingly, a positive-going input pulse at terminal 2*e* of $+2.9$ volts will cause slight conduction via diode $D_2$ of trigger E, but the forward resistance of diode $D_2$ is such that the base of transistor $T_2$ remains at $-0.3$ volt. Thus, while a positive-going input pulse can turn off transistor $T_2$ of trigger A, it will be ineffective to turn off transistor $T_2$ of trigger E.

It may be observed that there are developed at the junctions between the two resistors interconnecting terminals 1*c*–1*e* and 6*c*–6*e* of the triggers C–E negative potentials of $-2.9$ volts. The negative potentials applied by way of the voltage dividers to the triggers B–D, already off, though not necessary to the operations so far described do later become importan.

The input pulse, previously referred to, is assumed to be the first of the series of illustrated input pulses applied to supply terminals 25 for actuating the commutator circuit.

With the above in mind, it will now be obvious that the first positive-going input pulse from supply terminals 25, assumed to have a magnitude of +2.9 volts, turns off transistor $T_2$ of trigger A, but is without effect upon the remaining triggers B–E, and in particular upon transistors $T_2$ thereof.

Considering now the operations within trigger A, with transistor $T_2$ non-conductive, a negative shift of potential occurs at the base of transistor $T_4$ which renders it more conductive. A similar negative shift of potential occurs at the emitter of transistor $T_4$ which is applied by way of the R-C coupling network to the base of transistor $T_1$. This negative shift of potential turns on transistor $T_1$. As it becomes conductive, there is a positive shift of potential at the base of transistor $T_3$ which renders it less conductive. Thus while transistors $T_1$ and $T_2$ are selectively switched between On and Off states, the transistors have their conductivities changed from low to high values.

The trigger A has now been changed from its On state to its Off state. It is to be observed that with the increase of conduction of transistor $T_4$, there appears at output terminal 11*a*, a potential of −5.8 volts. Terminal 11*a* is connected to terminal 5*a* of gate $G_1$ and thus negatively biases the diode $D_1$ to cut-off.

It will be understood that while the transistor $T_3$ was in a more conductive condition, the initial condition, the output terminal 13*a* had a potential of −5.8 volts. That voltage changes, when transistor $T_3$ changes to a less conductive condition, in a positive-going direction, that is, toward zero or ground potential. Terminal 13*a* is connected by way of conductors 15 and 18 to input terminal 3*b* of gate $G_1$ of trigger B and is effective by way of the capacitor and the diode $D_1$ to render transistor $T_1$ non-conductive. Transistor $T_1$ is turned off notwithstanding the connection of terminal 5*b* of gate $G_1$ to output terminal 11*b* for the following reason: from terminal 11*b* there is applied to terminal 5*b* a negative potential of −5.8 volts. However, at the junction between the voltage-dividing resistors extending from terminal 5*b* and ground, the potential is −2.9 volts. Accordingly, the positive-going pulse of 5.8 volts from terminal 13*a* applied through the coupling capacitor produces a positive shift in potential adequate to overcome the negative bias of −2.9 volts, and thus the transistor $T_1$ of trigger B is turned off. This initiates the switching action of trigger B.

As transistor $T_1$ of trigger B is turned off, there is a negative shift of potential at the base of transistor $T_3$ which renders it more conductive. There is also a resultant negative shift of potential at the emitter of transistor $T_3$ which is applied by way of the R-C coupling network to the base of transistor $T_2$ which turns on transistor $T_2$. With transistor $T_2$ turned on, there is a positive shift of potential at the base of transistor $T_4$ when renders it less conductive. This completes the switching action of trigger B which is now on.

It may now be observed that there has been accomplished, as indicated in FIG. 1, the switching sequence in which for the initial conditions, for "zero" in the decimal system, adjacent triggers A and E were on. Upon application of the first pulse, trigger A was turned off; trigger B was turned on and trigger E remained on.

In the operation of trigger A from its On to its Off state, and in the operation of trigger B to the On state, other changes of potential have occurred which condition the commutator circuit for the next operation in response to the next pulse applied at input terminals 25. These will now be described.

As transistor $T_3$ of trigger A was rendered less conductive, the fall of the negative potential at output terminal 13*a*, although giving rise through the capacitor to the positive shift in potential above described, in fact reduces to zero from a negative value. Therefore, the negative potential applied from output terminal 13*a* to terminal 6*e* of gate $G_2$ of trigger E is reduced to zero. This reduces to zero the negative potential previously applied at the junction between the resistors interconnecting terminals 1*e* and 6*e*. In this manner, trigger E is conditioned to be responsive to the second input pulse from terminals 25. Trigger E is so conditioned since the diode $D_2$ of trigger E is no longer cut off and will, therefore, pass to transistor $T_2$ the second input pulse.

Remembering that while trigger A was on and transistor $T_4$ was in its less conductive condition, there was zero potential at output terminal 11*a*. As transistor $T_4$ is turned to its more conductive condition, there now appears a negative potential at terminal 11*a* which is applied to terminal 5*a* to block or cut off the diode $D_1$ of trigger A.

It is important to note that from trigger E, still on, there is applied from output terminal 13*e* by way of conductors 23 and 27, a negative potential to the terminal 1*b* of gate $G_2$ of trigger B. Thus the trigger B, which was just turned on, will not respond to the second positive-going input pulse to be applied to the commutator system.

It may be further noted that from output terminal 13*b* there is applied a negative potential by way of conductors 24 and 26 to terminal 6*a* of trigger A. This negative potential blocks diode $D_2$ of trigger A, a function which becomes important as will later appear.

The application of the second positive-going input pulse, though applied to each of input terminals 2*a*–2*e*, is only effective upon trigger E which was previously conditioned to be responsive to the second input pulse. This second pulse applied by way of the coupling capacitor turns off transistor $T_2$. The resultant negative shift of potential at the base of transistor $T_4$ renders that transistor more conductive. The negative shift of potential at the emitter is applied by way of the R-C coupling network to the base of transistor $T_1$ to turn that transistor on. The resultant positive shift of potential at the base of transistor $T_3$ renders that transistor less conductive. As transistor $T_3$ changes to its less conductive condition, the negative potential at output terminal 13*e* approaches zero. This change of potential, in a positive-going direction, is applied by way of conductor 23 to input terminal 3*a* of trigger A. Since the magnitude will be of the order of 5.8 volts, it will overcome the negative potential of −2.9 volts at diode $D_1$. This diode will thus be conductive and will transmit the positive-going pulse to turn off transistor $T_1$ of trigger A. In the manner described above for trigger B, when transistor $T_1$ of trigger A is turned off, it initiates the switching operations to turn trigger A on. Besides turning off transistor $T_1$, transistor $T_4$ will change to its less conductive condition, while transistor $T_2$ of trigger A will again be turned on and transistor $T_3$ will change to its more conductive condition.

As trigger E is turned off by the second input pulse, the potential at output terminal 13*e* reduces to zero. The previously developed negative potential at terminal 13*e*, applied by way of conductors 23 and 27 to terminal 1*b* of trigger B, is reduced to zero. This removes the blocking potential from diode $D_2$ and conditions trigger B to be responsive to the third input pulse.

Trigger A will not respond to the third input pulse since the above-described negative potential applied to input terminal 6*a* from output terminal 13*b* of trigger B remains effective to block diode $D_2$ of gate $G_2$ of trigger A.

The application of the third pulse is effective to turn off trigger B and to initiate a further cycle of operations similar to those above described and which results in turning trigger C on.

With the application to the system of the third and the succeeding pulses, similar operations occur which have been graphically presented in the following table. The table illustrates the conductivity states of the two inverter transistors $T_1$ and $T_2$ of each trigger during a count from 0 to 9. The table also illustrates the high conductivity states H of the cross-connected transistors $T_3$ and $T_4$. It is believed that this table taken in conjunction with the above description will make clear the operation at all stages of counting.

*Table 1*

| | Trigger A | | | | Trigger B | | | | Trigger C | | | | Trigger D | | | | Trigger E | | | |
|---|---|---|---|---|---|---|---|---|---|---|---|---|---|---|---|---|---|---|---|---|
| | $T_1$ | $T_2$ | $T_3$ | $T_4$ | $T_1$ | $T_2$ | $T_3$ | $T_4$ | $T_1$ | $T_2$ | $T_3$ | $T_4$ | $T_1$ | $T_2$ | $T_3$ | $T_4$ | $T_1$ | $T_2$ | $T_3$ | $T_4$ |
| 0 | ------ | On | H | ---- | On | ------ | ---- | H | On | ------ | ---- | H | On | ------ | ---- | H | ------ | On | H | ---- |
| 1 | On | ------ | ---- | H | ------ | On | H | ---- | On | ------ | ---- | H | On | ------ | ---- | H | ------ | On | H | ---- |
| 2 | ------ | On | H | ---- | ------ | On | H | ---- | On | ------ | ---- | H | On | ------ | ---- | H | On | ------ | ---- | H |
| 3 | ------ | On | H | ---- | On | ------ | ---- | H | ------ | On | H | ---- | On | ------ | ---- | H | On | ------ | ---- | H |
| 4 | On | ------ | ---- | H | ------ | On | H | ---- | ------ | On | H | ---- | On | ------ | ---- | H | On | ------ | ---- | H |
| 5 | On | ------ | ---- | H | ------ | On | H | ---- | On | ------ | ---- | H | ------ | On | H | ---- | On | ------ | ---- | H |
| 6 | On | ------ | ---- | H | On | ------ | ---- | H | ------ | On | H | ---- | ------ | On | H | ---- | ------ | ------ | ---- | ---- |
| 7 | On | ------ | ---- | H | On | ------ | ---- | H | ------ | On | H | ---- | On | ------ | ---- | H | ------ | On | H | ---- |
| 8 | On | ------ | ---- | H | On | ------ | ---- | H | On | ------ | ---- | H | ------ | On | H | ---- | ------ | On | H | ---- |
| 9 | ------ | On | H | ---- | ------ | ------ | ---- | ---- | ------ | ------ | ---- | ---- | ------ | On | H | ---- | On | ------ | ---- | H |

Referring again to FIGS. 1 and 3, it may be observed that for rows 0–9, triggers A, E, B, A, C, B, D, C, E and D are in the order named successively conditioned to be responsive to input pulses corresponding with said rows and to be turned off in the order named. It may be further observed that for the conditions represented by the "0" row, the output circuit 13*a* biases trigger E so that it will not respond to the next applied input pulse; that is, the first input pulse. Trigger E through its output circuit 13*e* applies its blocking potential to terminal 1*b* of trigger B to prevent this trigger from responding to the second pulse. When trigger B is turned on, it applies its blocking potential to trigger A, terminal 6*a*. When trigger A is again turned on, it applies a blocking potential to trigger C, terminal 1*c*. When trigger C is on, it applies its blocking potential to trigger B, terminal 6*b*. When trigger B is again on, it applies its blocking potential to trigger D, terminal 1*d*. When trigger D is turned on, it applies its blocking potential to trigger C, terminal 6*c*. When trigger C is again turned on, it applies its blocking potential to trigger E, terminal 1*e*. When trigger E is again turned on, the blocking potential is applied to trigger D, terminal 6*d*. When trigger D is again turned on, it applies its blocking potential to trigger A, terminal 1*a*. When trigger A is again turned on, it applies its blocking potential to trigger E, terminal 6*e*. From the above it may be seen that one of the two terminals 1 and 6 of each of the triggers has applied thereto a blocking potential from the trigger located one trigger forward in the ring and the other one of the terminals 1 and 6 of each of the triggers has applied thereto a blocking potential from the trigger located two triggers backward in the ring. Thus the blocking potentials are successively effective to maintain the respective triggers in their conductive states during the application of the pulse next succeeding the one which turned on such triggers. Each such trigger is then conditioned to be turned off. There is thus produced the operation in accordance with the two-by-two walking code utilized as part of the present invention.

It will be remembered that the negative going reset pulse 21*a* of FIG. 3 was described as effective to turn on triggers A and E and that the result of the application of the reset pulse 21*a* was to turn off triggers B–D. The reset pulse 21*a* is applied between terminals 20 and 21. The terminal 21 is connected to input terminals 12', 12' of the bistable devices A and E, and by action of the negative going reset pulse 21*a*, the transistors $T_2$ of the respective devices A and E are turned on which produces a switching action which turns on the transistors $T_3$ of the two stages of the two devices A and E. It will be noted that the terminal 21 is connected to the respective input terminals 12 of bistable devices B, C and D. Accordingly, the negative going pulse 21*a* turns on transistors $T_1$ of the devices, the result of which is to turn off the transistors $T_3$ of these devices and to turn on transistors $T_4$ of these devices. Since in each of the triggers or bistable devices one or the other of transistors $T_3$ and $T_4$ is always on, the reference to the trigger or bistable device as being in the On state has always been in reference to the output circuit from each device, which output circuits have been identified as 13*a*–13*e* respectively. Mention has already been made that outputs may also be taken from the terminals 11*a*–11*e*, in which event the On and Off terminology would be reversed in the description of the operation. Accordingly, in the claims there has been utilized a reference to the first and second stable states of the circuit elements forming the triggers or bistable devices of the present invention.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. For example, the present invention is applicable to triggers or switching devices of other types including vacuum tubes. It is the intention, therefore, to be limited only as indicated by the scope of the following claims.

What is claimed is:

1. A ring counter comprising a plurality of bistable devices characterized in that a succession of applied input pulses provides a two-by-two walking code having twice as many distinctive combinations as there are devices in the ring, each of said plurality of devices have a first state and a second state and each having at least one input circuit, means for switching two of said devices to their respective first states and for switching each of the remaining of said devices to their respective second states, and gating means associated with each said device, each said gating means having (1) an input circuit to which said input pulses are applied, (2) an output circuit connected to said input circuit of its associated device, and (3) two biasing circuits, one of them connected only to an output of the device next forward in the ring and the other connected only to an output of the device two devices backward in the ring from it for developing blocking potentials to prevent its associated device from responding to said applied input pulses.

2. A counting circuit comprising a plurality of bistable devices connected in a ring having twice as many distinctive combinatorial first states as there are devices in said ring, each of said plurality of devices having a first state and a second state and each having at least one input circuit and at least one output circuit, means for switching an adjacent two of said devices to their respective first states and for switching each of the remaining of said devices to their respective second states preparatory to the initiation of a count, gating means associated with each said device, each said gating means having an output circuit connected to said input circuit of its associated device and having an input circuit and two biasing circuits, and means for applying concurrently to each of said input circuits of said gating means a succession of input pulses to be counted, one of said biasing circuits of each of said gating means including a connection to said output circuit of the device next forward in said ring and the other of said biasing circuits of each of said gating means including a connection to said output circuit of the device two devices backward in said ring from it.

3. A commutator circuit comprising a plurality of bistable devices each having a first and a second stable state, means for setting two of said devices in said first stable state and the remainder in said second stable state, gate means associated with each of said plurality of devices and operable in response to the first stable state of either of a predetermined pair of said devices for blocking input pulses applied thereto, said gate means when said predetermined devices are in said second table state for transmitting applied input pulses to its associated bistable device, means for simultaneously applying a succession of input pulses to all of said gate means, said gate means of one of said two devices in said first stable state including connections to the other of said two devices to provide a bias to block the input pulse from being applied to said one of said two devices and said gate means of the other of said two devices in said first stable state being operative to pass said pulse to said device to change it to said second stable state, means responsive to the operation of said last-mentioned device to its second state for changing the state of the succeeding bistable device from its second to its first stable state, the change of said bistable device from said first state to its second state removing said bias from said gate means associated with said device which remained in its said first state to condition it for operation by the next appearing pulse from its first state to its said second state, and means connecting each of the remainder of said bistable devices with other of said bistable devices for turning off one, conditioning another, and turning on a third of said devices with each succeeding input pulse thereby producing distinctive combinatorial conductive states of said devices differing one from the other and each including two of said devices in said first state which devices are cyclically advanced around the commutator circuit.

4. The commutator circuit of claim 3 in which each said bistable device comprises four transistors the emitters of two of them being cross-connected through R-C networks to the bases of the other two of them, at least one of said last-mentioned transistors each having associated therewith said gate means, said gate means each including a diode having biasing circuits for preventing transmission through the diode of input pulses of predetermined amplitude.

5. The commutator circuit of claim 3 in which there are provided output circuits in number equal to said distinctive combinatorial states of said devices, one of said output circuits including connections to said two devices in said first state and the remainder of said output circuits extending to other devices which are in succession switched to said first state.

6. The commutator circuit of claim 5 in which each output circuit includes signal producing means for producing an output signal each time the two devices of said output circuit have been switched to said first state.

7. The commutator circuit of claim 5 in which there is included in each said output circuit an AND circuit for producing an electrical output each time the two devices thereof have been switched to said first state.

8. A counting circuit comprising a plurality of bistable devices connected in a ring, each of said plurality of bistable devices having a first state and a second state and each having at least one input circuit and at least one output circuit, means for switching two of said devices to their respective first states and for switching each of the remaining of said devices to their respective second states preparatory to the initiation of a count, gating means associated with each said device, each said gating means having an output circuit connected to said input circuit of its associated device and having an input circuit and two biasing circuits, and means for applying concurrently to each of said input circuits of said gating means a succession of input pulses to be counted, one of said biasing circuits of each of said gating means including a connection to said output circuit of the device next forward in the ring and the other of said biasing circuits of each of said gating means including a connection to said output circuit of the device two devices backward in the ring from it so that for alternate input pulses said two devices in said first state are adjacent in said ring and for the intervening input pulses the forward one of said two adjacent devices in said first state advances one device in said ring, leaving said two devices in said first state separated by a device in said second state to provide twice as many distinctive combinatorial first states as there are devices in said ring.

9. The counting circuit of claim 8 in which each device has an additional input circuit extending to said output circuit of the preceding one of said devices and operable upon the switching of said preceding device from its first to its second state to apply an input to said additional input circuit to switch the forwardly located device from its second to its first state.

10. The commutator circuit of claim 3 in which said devices comprise four transistors, two of which are cross-connected with the bases of the other two transistors, said gating means being connected to the base of at least one of said last-named transistors.

11. A ring counter comprising a plurality of bistable devices each having a first state and a second state and each having at least two input circuits and at least one output circuit, an individual switching circuit associated with each said device having connections from one of said input circuits of its associated device to said output circuit of the preceding device, gating means associated with each said device, each said gating means having an output circuit connected to the other one of said input circuits of its associated device and having an input circuit and two biasing circuits, a first of said biasing circuits of each of said gating means including a connection to said output circuit of the device located one device forward in said ring from it, and a second of said biasing circuits of each of said gating means including a connection to said output circuit of a device located two devices backward in said ring from it, said biasing circuits being effective when either of the devices to which it is connected is in said first state to prevent transmittal through said gating means of a pulse applied to said input circuit of said gating means, means for switching a first and a second of said devices to their respective first states and for switching each of said remaining of said devices to their respective second states preparatory to the initiation of a count, said first and said second devices being adjacent each other in said ring circuit, means for applying concurrently to each of said input circuits of said gating means a succession of input pulses to be counted, each of said input pulses having a characteristic for producing switching of each of said devices from its first to its second state, to provide by said succession of input pulses successive switching of said devices in accordance with a two-by-two walking code in which a first of said input pulses switches said second device to its second state, said second device then switching to its first state a third device located one device forward in the ring from said second device, the second of said pulses switching said first device to its second state, said first device then switching said second device to its first state and continuing the aforesaid switching pattern for said second and said third devices thereby to provide twice as many distinctive combinatorial first states as there are devices in said ring and each said combinatorial first states including first states of two of said devices.

12. The ring counter of claim 11 in which there is provided a voltage-divider network for each of said gating means, said first of said biasing circuits including a connection to one end portion of said voltage-divider network, said second of said biasing circuits including a connection to another end portion of said network, said input circuit including a connection to a point intermediate said end portions to provide a cancellation of said input pulse when either of the devices to which said biasing circuits are connected is in said first state.

13. A counting circuit comprising a plurality of bistable devices each having an On state and an Off state and each having at least two input circuits and at least one output circuit, first gating means associated with each said device and each having one input circuit and one output circuit, said output circuit of each of said first gating means being connected to one of said input circuits of its associated device, each input circuit of each of said first gating means being connected to said output circuit of the preceding device to form a ring circuit for applying to its associated device a pulse for switching that device from its Off to its On state when said preceding device switches from its On to its Off state, second gating means associated with each said device, each said second gating means having an output circuit connected to the other one of said input circuits of its associated device and having an input circuit and two biasing circuits, one of said biasing circuits of each of said second gating means including a connection to said output circuit of the device located one device forward in said ring from it and the other of said biasing circuits of each of said second gating means including a connection to said output circuit of a device located two devices backward in said ring from it, said biasing circuits being effective when either of the devices to which it is connected is On to prevent transmittal through said second gating means of a pulse applied to said input circuit of said second gating means, means for switching a first and a second of said devices to their respective On states and for switching each of said remaining of said devices to their respective Off states preparatory to the initiation of a count, said first and said second devices being adjacent each other in said ring circuit, means for applying concurrently to each of said input circuits of said second gating means a succession of input pulses to be counted, each of said input pulses having a characteristic for producing switching of each of said devices from its On to its Off state, to provide by said succession of input pulses successive switching of said devices in accordance with a two-by-two walking code in which a first of said input pulses switches Off said second device, said second device then switching On a third device located one device forward in the ring from said second device, the second of said pulses switching Off said first device, said first device then switching On said second device and continuing the aforesaid switching pattern thereby to provide twice as many distinctive combinatorial On states as there are devices in said ring and each said combinatorial On state including On states of two of said devices.

14. A counting circuit comprising a plurality of bistable devices each having a first state and a second state and each having at least two input circuits and at least one output circuit, an individual switching circuit associated with each said device having connections from one of said input circuits of its associated device to said output circuit of the preceding device to form a ring circuit for allowing transmittal of a pulse to its associated device for switching that device from its second to its first state when said preceding device switches from its first to its second state, gating means associated with each said device, each said gating means having an output circuit connected to the other one of said input circuits of its associated device and having an input circuit and two biasing circuits, one of said biasing circuits of each of said second gating means including a connection to said output circuit of the device located one device forward in said ring from it and the other of said biasing circuits of each of said gating means including a connection to said output circuit of a device located two devices backward in said ring from it, said biasing circuits being effective when either of the devices to which it is connected is in its first state to prevent transmittal through said gating means of a pulse applied to said input circuit of said gating means, means for switching a first and a second of said devices to their respective first states and for switching each of said remaining of said devices to their respective second states preparatory to the initiation of a count, said first and said second devices being adjacent each other in said ring circuit, means for applying concurrently to each of said input circuits of said gating means a succession of input pulses to be counted, each of said input pulses having a characteristic for producing switching of each of said devices from its first to its second state, said first device having applied to its associated gating means by way of one of its biasing circuits a biasing potential from the output circuit of said second device to maintain said first device in its first state upon application thereto of a first of said input pulses, said first input pulse switching said second device from its first to its second state, said second device in being switched from its first to its second state producing an output applied to a third device located one device forward in the ring from said second device by way of said switching circuit of said third device to switch that device from its second to its first state, said third device having applied to its associated gating means by way of one of its biasing circuits a biasing potential from the output circuit of said first device to maintain said third device in its first state upon application thereto of a second of said input pulses, said second input pulse switching said first device from its first to its second state, said first device in being switched from its first to its second state producing an output applied to said second device by way of said switching circuit of said second device to switch that device from its second to its first state, and for the succeeding input pulses continuing the aforesaid switching pattern to provide a two-by-two walking code having twice as many distinctive combinatorial first states as there are devices in said ring circuit, said pattern moving progressively about said ring circuit.

15. A counting circuit comprising a plurality of bistable devices each having an On state and an Off state and each having at least two input circuits and at least one output circuit, first gating means associated with each said device and each having one input and one output, said output circuit of each of said first gating means being connected to one of said input circuits of its associated device, each input circuit of each of said first gating means being connected to said output circuit of the preceding device to form a ring circuit for applying to its associated device a pulse for switching that device from its Off to its On state when said preceding device switches from its On to its Off state, second gating means associated with each said device, each said second gating means having an output circuit connected to the other one of said input circuits of its associated device and having an input circuit and two biasing circuits, one of said biasing circuits of each of said second gating means including a connection to said output circuit of the device located one device forward in said ring from it and the other of said biasing circuits of each of said second gating means including a connection to said output circuit of a device located two devices backward in said ring from it, said biasing circuits being effective when either of the devices to which it is connected is On to prevent transmittal through said second gating means of a pulse applied to said input circuit of said second gating means, means for switching a first and a second of said devices to their respective On states and for switching each of said remaining of said devices to their respective Off states preparatory to the initiation of a count, said first and said second devices being adjacent each other in said ring circuit, means for applying concurrently to each of said input circuits of said second gating means a succession of input pulses to be counted, each of said input pulses having a polarity for producing switching of each of said devices from its On to its Off state, said first device having applied to its associated second gating means by way of one of its biasing circuits a biasing potential from the output circuit of said second device to maintain said first device in its On state upon application thereto of a first of said input pulses, said first input pulse switching said second device from its On to its Off state, said second device in being switched from its On to its Off state producing an output applied to a third device located one device forward in the ring from said second device by way of said first gating means of said third device to switch that device from its Off to its On state, said third device having applied to its associated second gating means by way of one of its biasing circuits a biasing potential from the output circuit of said first device to maintain said third device in its On state upon application thereto of a second of said input pulses, said second input pulse switching said first device from its On to its Off state, said first device in being switched from its On to its Off state producing an output applied to said second device by way of said first gating means of said second device to switch that device from its Off to its On state and for the succeeding input pulses continuing the aforesaid switching pattern to provide a two-by-two walking code having twice as many distinctive combinatorial On states as there are devices in said ring circuit, said pattern moving progressively about said ring circuit.

References Cited in the file of this patent

UNITED STATES PATENTS

| | | |
|---|---|---|
| 2,411,714 | De Rosa | Nov. 26, 1946 |
| 2,416,095 | Golden | Feb. 18, 1947 |
| 2,436,963 | Grosdoff | Mar. 2, 1948 |
| 2,470,716 | Overbeck | May 17, 1949 |
| 2,514,037 | Dickinson | July 4, 1950 |
| 2,580,771 | Harper | Jan. 1, 1952 |
| 2,584,720 | Lawson | Feb. 5, 1952 |
| 2,901,607 | Stoddard | Aug. 25, 1959 |
| 2,935,255 | Reiner | May 3, 1960 |

UNITED STATES PATENT OFFICE
CERTIFICATE OF CORRECTION

Patent No. 3,051,853 August 28, 1962

Leonard Roy Harper

It is hereby certified that error appears in the above numbered patent requiring correction and that the said Letters Patent should read as corrected below.

Column 9, line 13, for "table state for" read -- stable state --; line 43, strike out "each"; column 10, line 21, for the claim reference numeral "3" read -- 8 --.

Signed and sealed this 2nd day of April 1963.

(SEAL)
Attest:

ESTON G. JOHNSON
Attesting Officer

DAVID L. LADD
Commissioner of Patents